United States Patent [19]

Maddern et al.

[11] Patent Number: 4,648,090
[45] Date of Patent: Mar. 3, 1987

[54] ARRANGEMENT FOR CONTROLLING SWITCHED SPEECH OR DATA COMMUNICATION IN A COMMUNICATIONS EXCHANGE

[75] Inventors: Thomas S. Maddern; Alexander S. Philip, both of Wimborne, United Kingdom

[73] Assignee: The Plessey Company plc, Ilford, England

[21] Appl. No.: 697,230

[22] Filed: Feb. 1, 1985

[30] Foreign Application Priority Data

Feb. 2, 1984 [GB] United Kingdom ............... 8402758

[51] Int. Cl.$^4$ ............................ H04J 3/12; H04J 3/06
[52] U.S. Cl. ..................................... 370/110.1; 370/100
[58] Field of Search ................ 370/100, 110.1, 110.4, 370/111, 106, 105.84

[56] References Cited

U.S. PATENT DOCUMENTS

| | | | |
|---|---|---|---|
| 3,772,475 | 11/1973 | Loffreda | 370/110.1 |
| 4,243,930 | 1/1981 | DeCoursey | 370/110.4 |
| 4,376,306 | 3/1983 | Giusto | 370/110.4 |
| 4,437,183 | 3/1984 | Profet | 370/110.1 |

FOREIGN PATENT DOCUMENTS

WO81/03095 10/1981 PCT Int'l Appl. .
1300003 12/1972 United Kingdom .
1377374 12/1974 United Kingdom .
1465076 2/1977 United Kingdom .
1501358 2/1978 United Kingdom .
1555394 11/1979 United Kingdom .
2074815 11/1981 United Kingdom .
2083319A 3/1982 United Kingdom .
2092863 8/1982 United Kingdom .

Primary Examiner—Douglas W. Olms
Assistant Examiner—Wellington Chin
Attorney, Agent, or Firm—Fleit, Jacobson, Cohn & Price

[57] ABSTRACT

The arrangement is for controlling speech communication in a communications exchange. The speech transmission is handled by a switchblock composed of a number of digital switching modules interconnected by a plurality of wire connections, and requiring the speech signals to be accompanied by bit and frame clock references to allow a receiving module to align the incoming data to its clock reference. The wire connections which carry frame synchronization information also carry control data which is bit interleaved with the frame synchronization information. Circuit means is provided which receives the bit interleaved frame synchronization information and control data, and demultiplexes the frame synchronization and control data to provide a retimed control data signal for use at the receiving module.

3 Claims, 7 Drawing Figures

ARRANGEMENT FOR CONTROLLING SWITCHED SPEECH OR DATA COMMUNICATION IN A COMMUNICATIONS EXCHANGE

BACKGROUND

The present invention relates to an arrangement for controlling switched speech or data communication in a communications exchange.

The invention is particularly useful in electronic telecommunications wherein the exchange speech transmission is handled by a switch block composed of a number of digital switching modules each providing PCM (Pulse Code Modulated) switching in a space-time-space format. Such a switching module is disclosed in British Patent Application No. 2083319A.

The transmission of speech through the switch block is synchronous at a transmission speed of 4 Mb/s, and for intermodule transmission it is necessary that the speech signals are accompanied by bit and frame clock references to allow the receiving module to align the incoming data to its clock reference. Two separate clock signal lines are necessary in the cables use for speech transmission between modules in the switchblock. One line carries a 2 MHz bit clock signal having both positive and negative edges active, and the other line carries the frame start information consisting of a digitally encoded synchronisation pattern in time slot zero.

Accordingly, an aim of the present invention is to provide an arrangement for controlling switched speech or data communication in a communications exchange in an economic and efficient manner by making use of the existing cabling interconnecting switching modules.

SUMMARY OF THE INVENTION

According to the present invention there is provided an arrangement for controlling switched speech or data communication in a communications exchange wherein speech or data transmission is handled by a switchblock composed of a number of digital switching modules interconnected by a plurality of wire connections, and requiring the speech or data signals to be accompanied by bit and frame clock references to allow a receiving module to align the incoming data to its clock reference characterised in that the wire connections which carry frame synchronisation information also carry control data which is bit interleaved with the frame synchronisation information, and circuit means is provided which receives the bit interleaved frame synchronisation information and control data and demultiplexes the frame synchronisation information and control data to provide a retimed control data signal for use at the receiving module.

BRIEF DESCRIPTION OF THE DRAWINGS

An embodiment of the invention will now be described with reference to the accompanying drawings in which.

DETAILED DESCRIPTION

Figure 1:
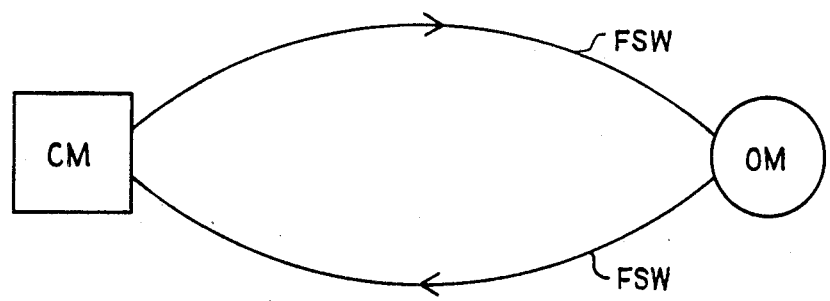
FIG. 1 shows an interconnection between a central switching module and an outer switching module.

Referring to FIG. 1 it can be seen that there is one frame start wire, FSW for each direction between each central switching module CM and each outer switching module OM. The frame start wires, FSW are also used to pass control information between the central switching module CM and the outer switching module OM.

Figure 2:
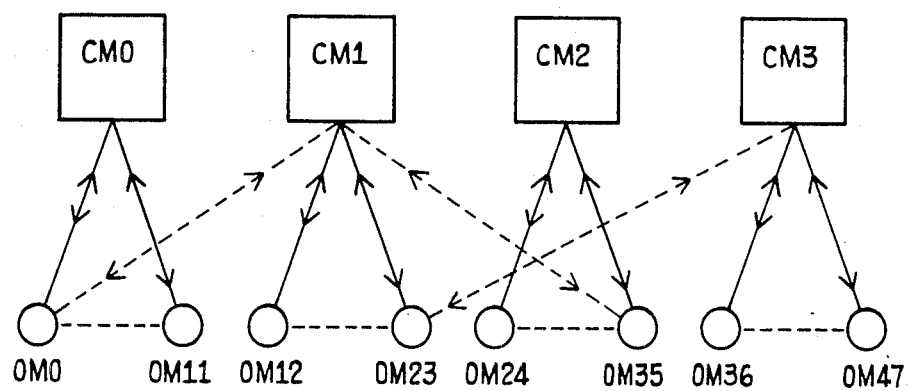
FIG. 2 shows bidirectional interconnections between a number of central modules and a number of outer modules capable of handling 3072 PCM lines.

Not all of the wires are used to carry control information and those which do carry control information are depicted by the solid bidirectional lines shown in FIG. 2.

Referring to FIG. 2 there is shown a plurality of central switching modules CMO-CM3, and a plurality of outer switching modules OMO-OM47 which handle 3012 PCM telecommunications lines.

The dashed bidirectional lines depict connections which only carry frame synchronisation information, however not all of these connections are shown.

It can be seen from FIG. 2 that a control message to or from an outer switching module OMO-OM11 for example is constrained to originate from or terminate at a particular central switching module CMO, for example. This constraint greatly reduces the number of control terminations that must be made at the outer and central switching modules and so reduces and simplifies the control communication hardware located at each module.

Figure 3:
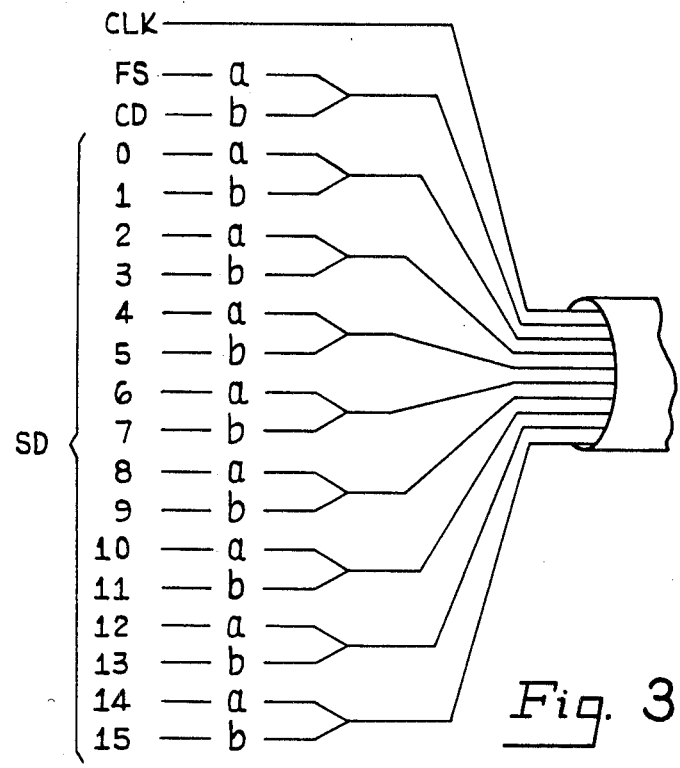
FIG. 3 shows the constitution of circuits in a 10 pair cable.

Referring to FIG. 3 it can be seen that the frame synchronisation information, FS is sent along circuit "a" of one balanced line pair of a 10 pair cable together with the control data CD, which is sent along circuit "b". Eight balanced line pairs are used for speech data, SD 0-15 and one balanced line pair carries the 2 Mb/s clock, CLK, which is used as a 4 Mb/s clock by making use of both its rising and falling edges. Each of the speech cable pairs carries the data at a rate of 4 Mb/s in bit interleaved fashion from the outputs of two switching modules whose transmission rates are each 2 Mb/s.

In the same manner, the control data, CD and frame synchronisation information, FS, are bit interleaved for transmission at the rate of 4 Mb/s. The control data link is independent of the frame synchronisation link and therefore there is no need to align the control data and it can be launched or sent bit synchronously at any time.

Figure 4:
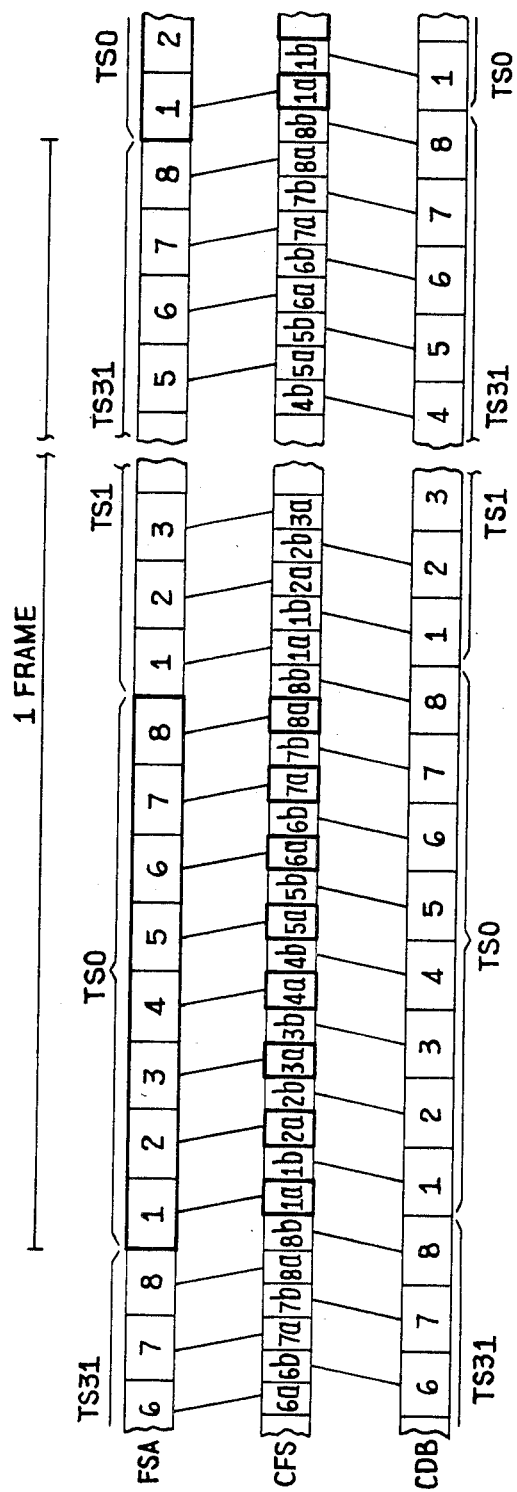
FIG. 4 shows the manner in which the frame synchronisation data and control data is bit interleaved.

FIG. 4 shows the maner in which the frame synchronisation information and the control data are bit interleaved. The frame synchronisation signal for the "a" stream, FSA, is shown at a rate of 2 Mb/s. One frame is composed of thirty two time slots TSO-TS31 each of eight bits in length. Time slot TSO carries the synchronisation bit pattern (11110000). Also shown is the control data for the "b" stream CDB at a rate of 2 Mb/s, and the two streams of information CDB and FSA are interleaved to comprise a composite frame start signal CFS at a rate of 4 Mb/s. By interleaving the bits in this manner control messages may start and end at any bit and time slot position.

Figure 5:
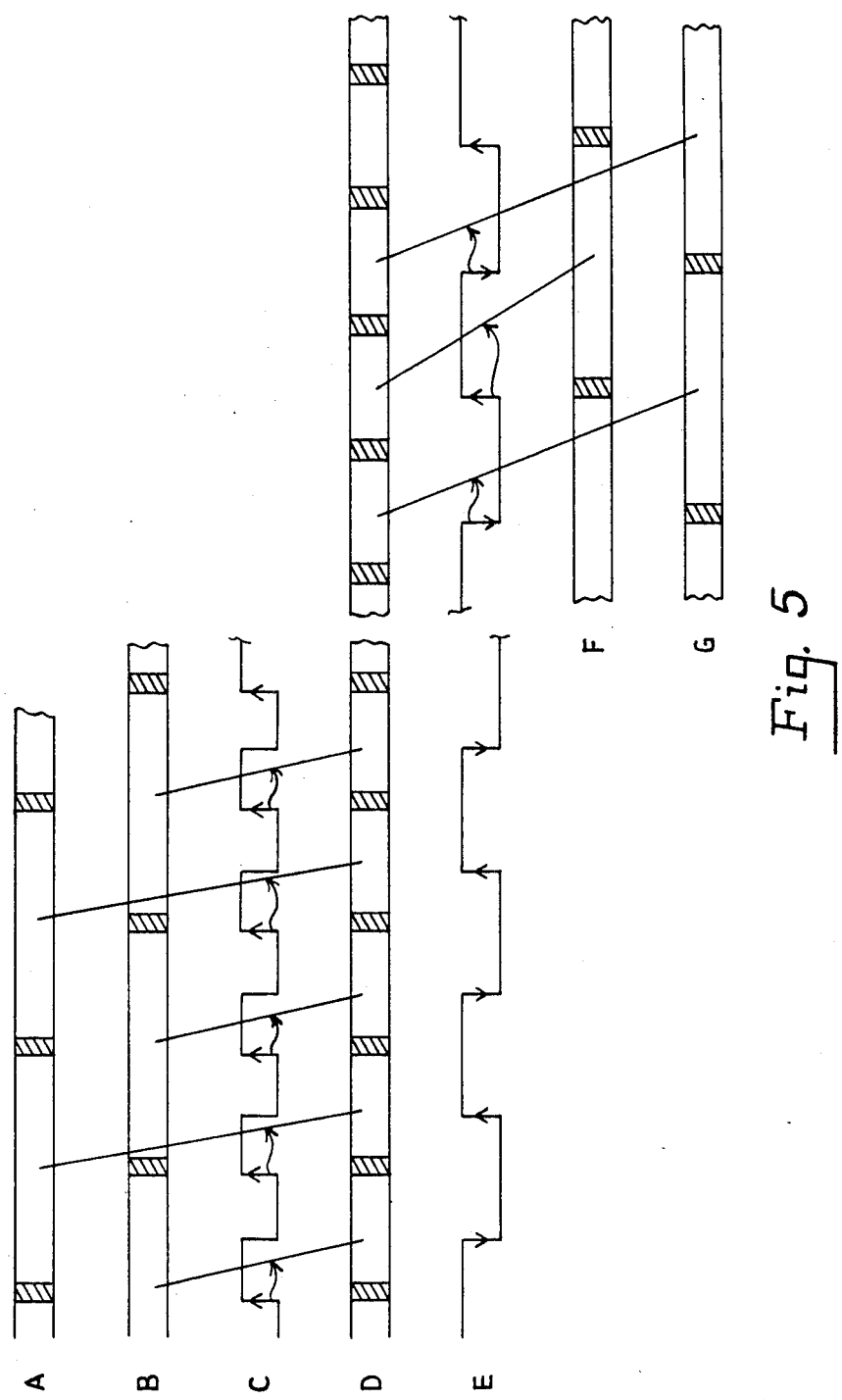
FIG. 5 shows the bit timing of a frame start wire.

Referring to FIG. 5, the launch of the frame start data is shown using a 4 MHz clock along with the recovery of the information at the receive end into two separate streams; frame synchronisation and control data. Signal A represents the frame synchronisation signal at a rate of 2 Mb/s. Signal B represents the control data at a rate of 2 Mb/s. Signal C represents the launch clock at 4 MHz. Signal D represents the frame start data at a rate of 4 Mb/s, and signal E represents the clock signal at a rate of 2 MHz. It is seen that the frame start data signal D is generated by interleaving signals A and B in accordance with the positive going edges of the launch clock signal C. Signals F and G represent respectively the recovered frame synchronisation information at a rate of 2 Mb/s, and the recovered control data at a rate of 2 Mb/s, the former being generated in accordance with the positive going edge of the clock signal E, and the latter in accordance with the negative going edge of the clock signal E.

Figure 6:
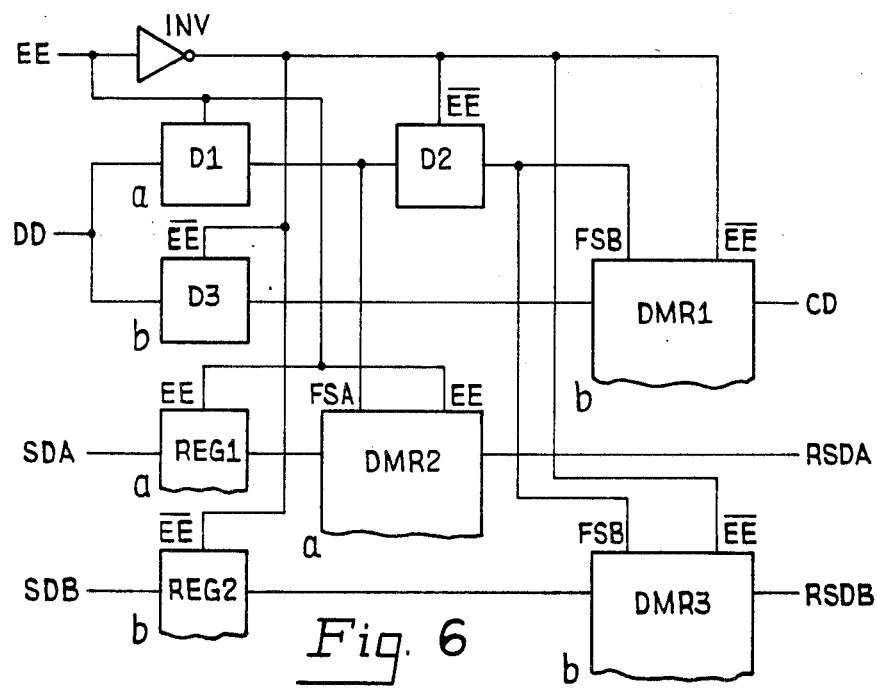
FIG. 6 shows the capture circuit for a 10 pair cable.
Figure 7:
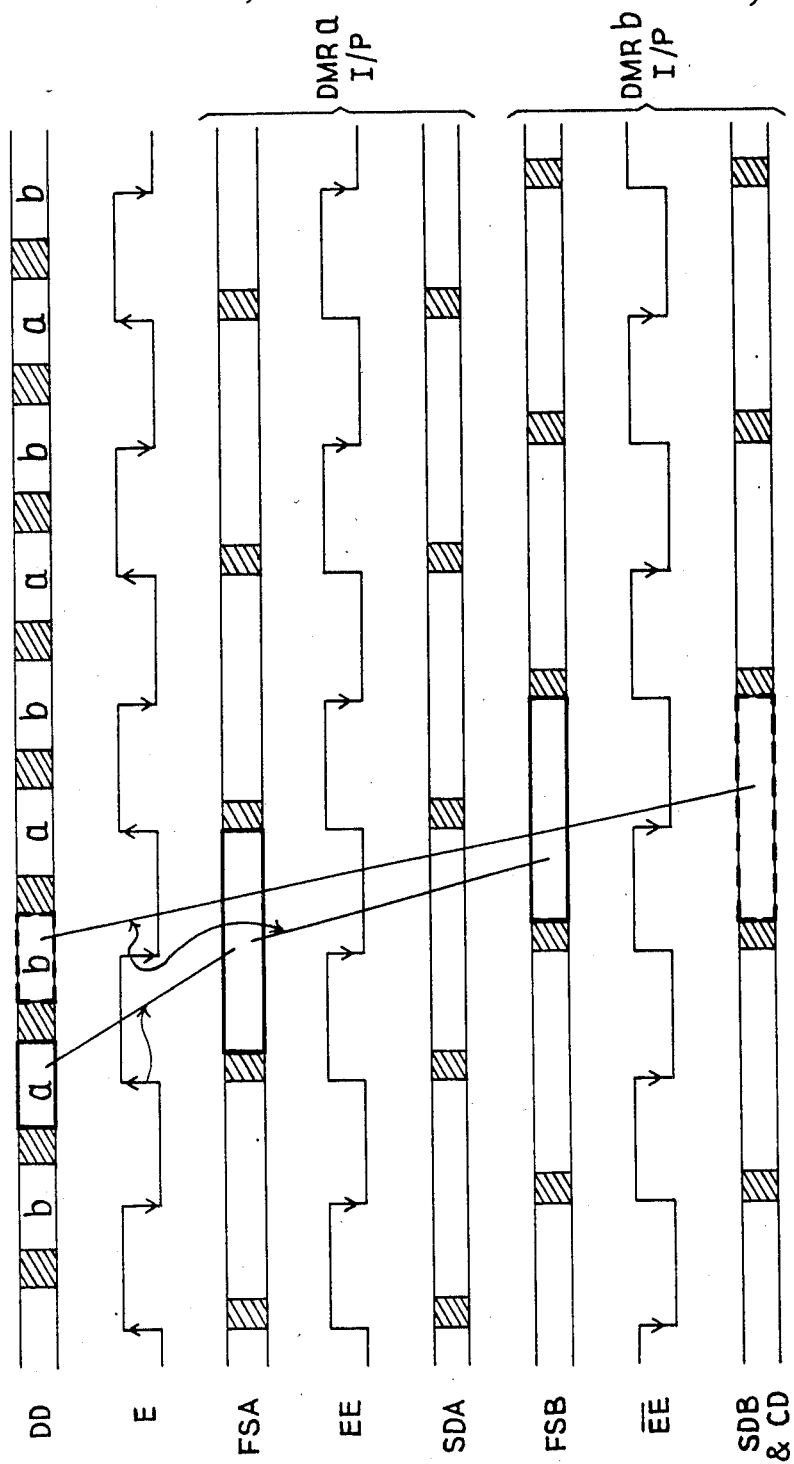
FIG. 7 shows the manner in which the line signals are demultiplexed into 2 Mb/s streams "a" and "b".

Referring to FIG. 6, a capture circuit is shown and the respective input signals are shown in FIG. 7. The 2 Mb/s clock signal EE is passed to register delay devices D1, register REG1 and demultiplexing-mixing-remultiplexing device DMR2. The demultiplexing-mixing-remultiplexing device is described in British Patent Application No. 2074815A and acts as a pre-programmed or counter driven digital switching module, and by adjusting the degree of DMR function a wide range of switch sizes is produced which use a common organisation in the controlled switching stages.

The clock signal EE is inverted by inverter INV and the inverted signal EE is passed to register delay devices D2 and D3, demultiplexing-mixing-remultiplexing devices DMR1 and DMR3 and register REG2. The frame start signal DD is passed to register delay device D1 for generation of "a" stream data, and to register delay device D3 for generation of "b" stream data. The output of device D3 is passed directly to the demultiplexing-mixing-remultiplexing device DMR1 whereas the output signal FSA of device D1 is further delayed by half a bit period by device D2 and the resulting signal FSB is passed to device DMR1. The output of device DMR1 generates retimed control data CD for the "b" stream at 2 Mb/s.

The frame start signal as delayed by device D1 produces a signal FSA which is passed to device DMR2, which receives speech data SDA at 2 Mb/s by way of register REG1, and generates retimed speech data RSDA at 2 Mb/s for the "a" stream. Similarly speech data SDB is passed to device DMR3 by way of register REG2. Device DMR3 receives the delayed output signal FSB from register delay device D2 and generates retimed speech data RSDB for the "b" stream. The capture circuit can handle up to eight speech data signals, and the registers REG1, REG2 and the devices DMR1-3 have the capacity to handle eight speech data signals and generate eight retimed speech data signals for the respective "a" and "b" streams.

What we claim is:

1. An arrangement for controlling switched speech or data communication in a communications exchange wherein speech or data transmission is handled by a switchblock compound of a number of digital switching modules interconnected by a plurality of communication paths, and requiring the speech or data signals to be accompanied by bit and frame clock references to allow a receiving module to align the incoming data to the receiving module's clock reference, characterised in that the communication paths which carry frame synchronisation information also carry control data information which is bit interleaved with the frame synchronisation information, in such a manner that a control data information can start and end at any bit and time slot position, and circuit means is provided which receives the bit interleaved frame synchronisation information and control data information and demultiplexes the frame synchronisation information and control data information to provide a retimed control data signal for use at the receiving module.

2. An arrangement as claimed in claim 1 wherein the circuit means generates two streams of frame start information for use in controlling a first demultiplexer-mixing-remultiplexer device, which generates, bit synchronously at its output, the retimed control data signal.

3. An arrangement as claimed in claim 2 wherein the switched speech or data communication is split into two streams, each stream having an associated capture register connected to an associated second or third demultiplexer-mixer-remultiplexer device which generates an associated retimed speech data stream at its output, wherein the second demultiplexer-mixer-remultiplexer device receives one stream of the frame start information, and the third demultiplexer-mixer-remultiplexer device receives the other stream of frame start information which is delayed by half a bit period.

* * * * *